US010850473B2

(12) United States Patent
Martin et al.

(10) Patent No.: US 10,850,473 B2
(45) Date of Patent: Dec. 1, 2020

(54) AQUATIC STRUCTURE

(71) Applicants: Ted Anthony Martin, Baton Rouge, LA (US); Chad Mathew Martin, Baton Rouge, LA (US); Chris Fetters, Baton Rouge, LA (US)

(72) Inventors: Ted Anthony Martin, Baton Rouge, LA (US); Chad Mathew Martin, Baton Rouge, LA (US); Chris Fetters, Baton Rouge, LA (US)

(73) Assignee: Marin Ecosystems, L.L.C., Baton Rouge, LA (US)

( * ) Notice: Subject to any disclaimer, the term of this patent is extended or adjusted under 35 U.S.C. 154(b) by 374 days.

(21) Appl. No.: 15/876,009

(22) Filed: Jan. 19, 2018

(65) Prior Publication Data

US 2018/0200982 A1 Jul. 19, 2018

Related U.S. Application Data

(60) Provisional application No. 62/448,193, filed on Jan. 19, 2017.

(51) Int. Cl.
| *E02B 3/06* | (2006.01) |
| *B32B 3/26* | (2006.01) |
| *B32B 5/02* | (2006.01) |
| *A01K 61/54* | (2017.01) |
| *A01K 61/73* | (2017.01) |
| *B32B 7/03* | (2019.01) |
| *E02B 3/26* | (2006.01) |
| *E02B 3/28* | (2006.01) |
| *B29C 53/56* | (2006.01) |

(52) U.S. Cl.
CPC ............... *B32B 3/26* (2013.01); *A01K 61/54* (2017.01); *A01K 61/73* (2017.01); *B32B 5/022* (2013.01); *B32B 7/03* (2019.01); *E02B 3/06* (2013.01); *E02B 3/26* (2013.01); *E02B 3/28* (2013.01); *B29C 53/562* (2013.01); *B32B 2255/02* (2013.01); *B32B 2305/20* (2013.01); *B32B 2307/732* (2013.01); *Y02A 40/81* (2018.01)

(58) Field of Classification Search
CPC ..... E02B 3/26; E02B 3/28; E02B 3/06; E02B 3/062
USPC ..................... 405/211, 212, 215, 216, 21, 25
See application file for complete search history.

(56) References Cited

U.S. PATENT DOCUMENTS

| 4,406,564 A | 9/1983 | Hanson |
| 4,693,631 A | 9/1987 | McKay |
| 4,697,957 A * | 10/1987 | Hellmers ................ E02D 5/60 405/212 |
| 4,738,563 A | 4/1988 | Clark |

(Continued)

FOREIGN PATENT DOCUMENTS

FR    2378902 A1 * 8/1978 ............... E02B 3/04

*Primary Examiner* — Frederick L Lagman
(74) *Attorney, Agent, or Firm* — John B. Edel; Edel Patents LLC

(57) ABSTRACT

Aquatic Structures are disclosed that include a nonwoven fiber mat, a connecting material, an anchor and a protective coating. The nonwoven fiber mat may be in the form of a roll having multiple layers and the connecting material may connect those layers. The roll may be submerged in a body of water and the anchor may be connected to a floor of the body of water. Uses of those aquatic structures are also taught.

17 Claims, 3 Drawing Sheets

(56) References Cited

U.S. PATENT DOCUMENTS

| | | | |
|---|---|---|---|
| 5,087,154 A * | 2/1992 | Crawford | E02B 17/0026 |
| | | | 405/211 |
| 5,175,973 A * | 1/1993 | Owen | E02D 5/226 |
| | | | 405/216 |
| 5,338,131 A | 8/1994 | Bestmann | |
| 5,586,838 A * | 12/1996 | Walsh | B29C 53/582 |
| | | | 156/187 |
| 5,678,954 A * | 10/1997 | Bestmann | E02B 3/12 |
| | | | 405/24 |
| 6,464,428 B1 * | 10/2002 | Mikell | E02B 3/126 |
| | | | 405/15 |
| 6,536,991 B1 * | 3/2003 | Trader | E02B 17/0008 |
| | | | 405/211 |
| 7,810,279 B2 | 10/2010 | Kania et al. | |
| 7,883,291 B2 * | 2/2011 | Theisen | E02D 17/20 |
| | | | 210/503 |
| 7,941,970 B2 | 5/2011 | Kania et al. | |
| 8,132,364 B2 | 3/2012 | Kania et al. | |
| 8,250,808 B2 | 8/2012 | Kania et al. | |
| 8,327,579 B2 | 12/2012 | Kania et al. | |
| 2004/0005198 A1 * | 1/2004 | Spangler | E02B 3/04 |
| | | | 405/302.6 |
| 2005/0161407 A1 * | 7/2005 | McPhillips | C09K 17/52 |
| | | | 210/747.3 |
| 2006/0088386 A1 * | 4/2006 | Ellis | E02D 5/60 |
| | | | 405/211.1 |
| 2011/0005444 A1 | 1/2011 | Kania et al. | |
| 2011/0146559 A1 | 6/2011 | Kania et al. | |
| 2013/0125825 A1 | 5/2013 | Kania et al. | |
| 2013/0272790 A1 * | 10/2013 | Melby, III | E02B 3/12 |
| | | | 405/21 |
| 2015/0132067 A1 * | 5/2015 | Isham | E02B 17/0017 |
| | | | 405/211 |
| 2016/0348327 A1 | 12/2016 | Martin et al. | |

* cited by examiner

AQUATIC STRUCTURE

Aquatic structures described herein may be used in marine environments in which the control of environmental conditions is desired. Certain aquatic structures disclosed herein may allow for the reduction of wave energy. Further, certain aquatic structures disclosed herein may allow for the modification of sediment profile at an installation site or aid in the control of the movement of sediment.

DETAILED DESCRIPTION

Example 1

Figure 1:
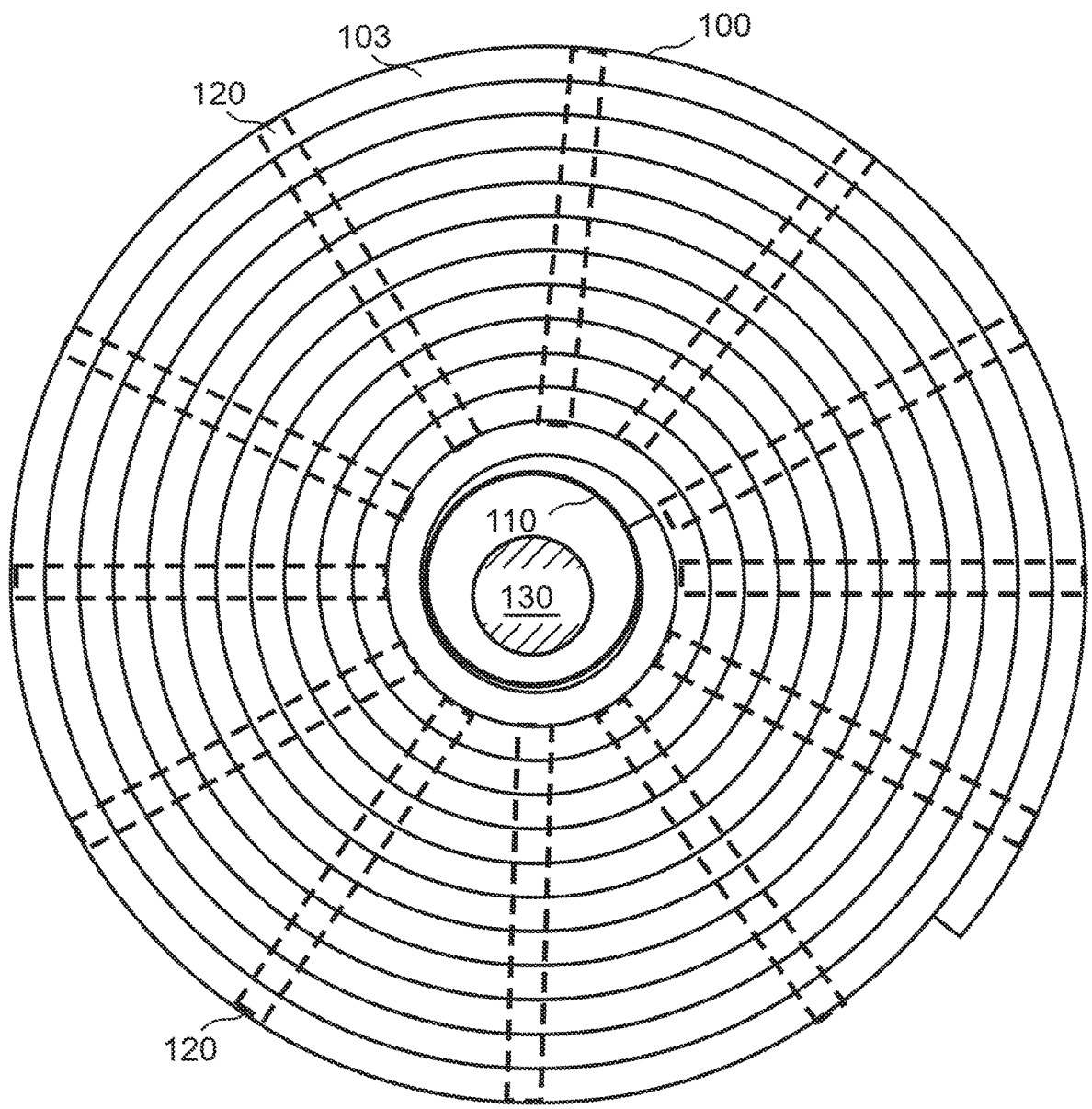
FIG. 1 shows a plan view of a roll on a piling.
Figure 2:
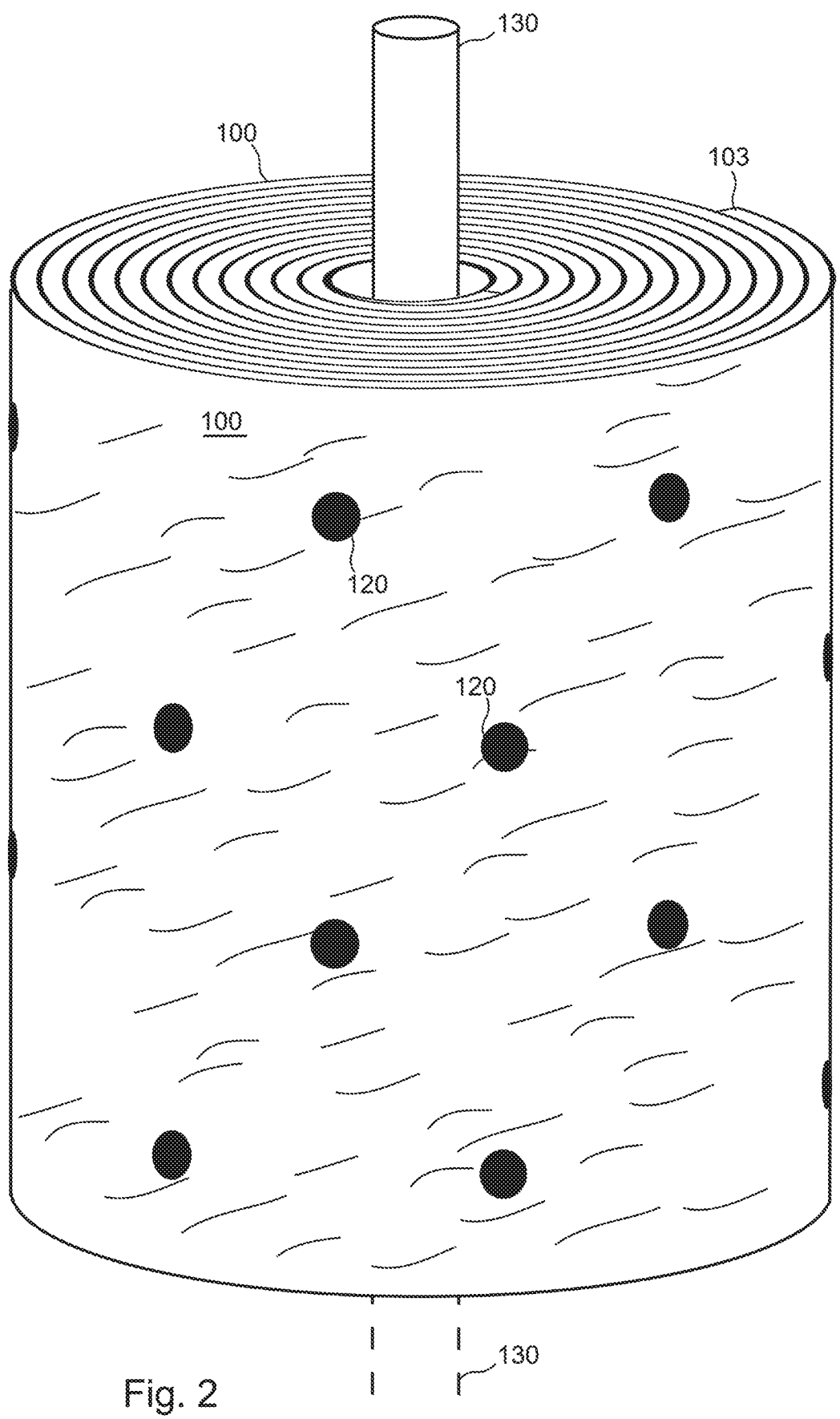
FIG. 2 shows a perspective view of a roll on a piling.
Figure 3:
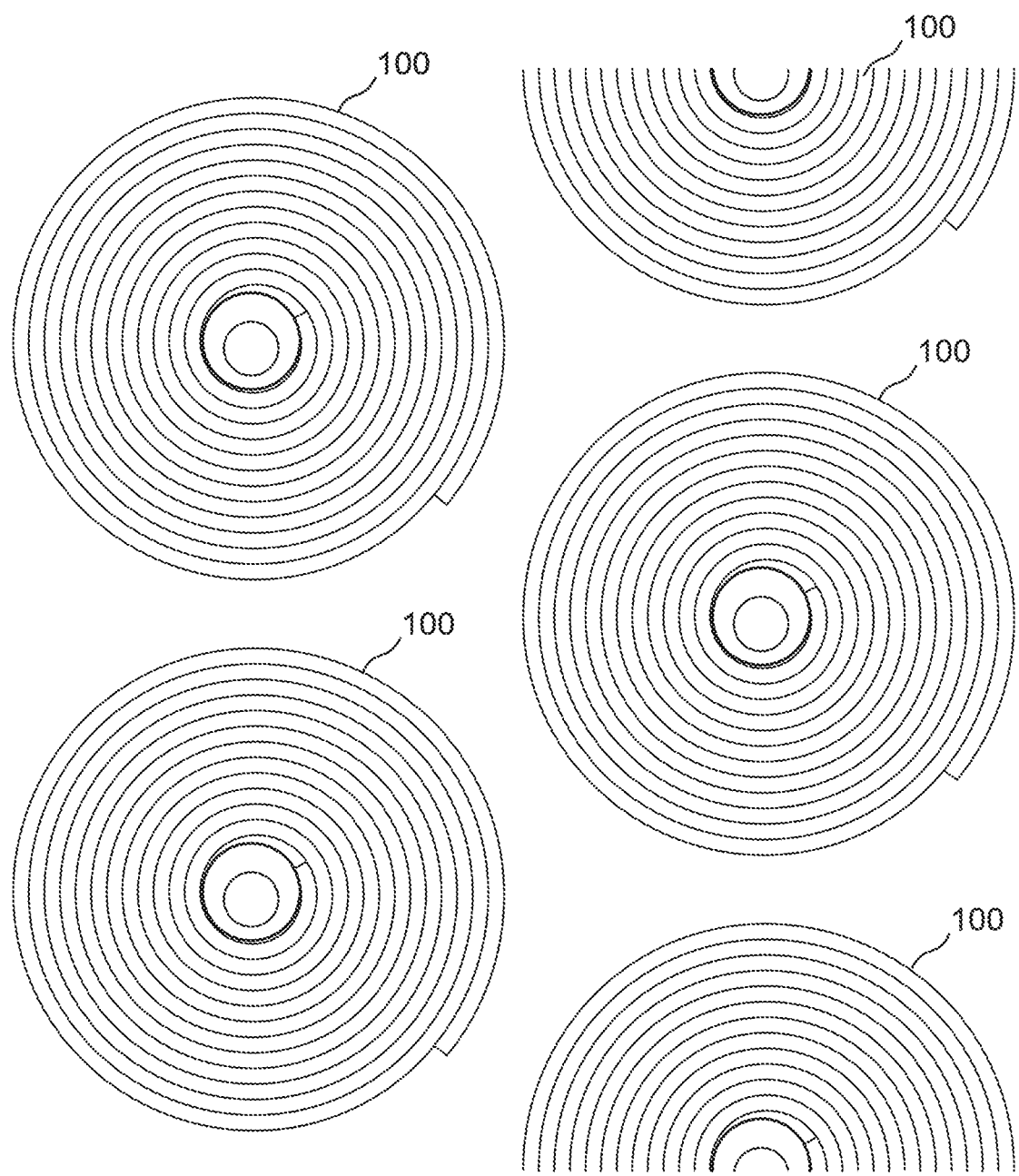
FIG. 3 shows a partial plan view of a two-row installation of aquatic structures.

FIGS. 1-3 depict Roll 100, Web pad 103, Interior tube 110, Spokes 120 and Piling 130. Roll 100 may be constructed from Web pad 103. Web pad 103 may be a nonwoven polyester fiber matrix produced from recycled content, such as bottles, having 200 denier fibers that are heat bound into a 2 inch thick sheet and coated with a water based latex resin. Nonwoven polyester fiber matrix of that variety may be acquired from Americo Manufacturing Company, Inc. 6224 North Main St. Acworth, Ga. 30101 as JCII nonwoven matrix. Interior tube 110 may be a cardboard tube and more particularly may be a heavy-duty concrete form tube. Web pad 103 may be wrapped around Interior tube 110 forming a configuration comparable to that shown in FIGS. 1 and 2. Spokes 120 may be added, bridging the various web pad layers in a spoke like configuration. Spokes 120 may be put in place by injection into the Roll 100 with a two-component polyurethane marine grade closed cell foam comprising polymeric diphenylmethane diisocyanate, component A, and a polyurethane resin blend with amine catalyst, component B. Such foam combinations may be obtained from Urethane Technology Co. at 59-77 Temple Avenue, Newburgh, N.Y. 12550. The resulting Spokes 120 may be 2 inches in diameter and range from the exterior surface of Roll 100 to a point near the center of Roll 100. Spokes 120 may avoid penetrating the innermost layer of Web pad 103. Interior tube 110 may be the same height of Roll 100 allowing for an open path through Roll 100. Roll 100 may then be slid over a Piling 130 which is may be situated in a marine environment. Roll 100 may be configured during installation such that the top of Roll 100 is within 2 feet of the surface of the water and may be configured such that the bottom of Roll 100 rests on the bottom of a body of water.

A coating may be applied to the exterior of the roll as a spray primer and a spray paint. The primer may be a low VOC modified urethane primer applied at a 5-mil thickness. The primer may be a two-component isocyanate and resin bled primer such as sold by VersaFlex Incorporated, 686 S. Adams Street, Kansas City, Kans. 66105, under model number VF 20. The exterior top coat may be a flexible, two-component polyurea elastomer spray coating material as sold by VersaFlex Incorporated, 686 S. Adams Street, Kansas City, Kans. 66105, under model number FSS 50DM and that material may be applied over the primer at a 45-mil thickness giving a total coating thickness on the exterior fibers of 50-mils.

Although Roll 100 is not perfectly symmetrical, Roll 100 may have a "central axis," which is the axis of symmetry of the smallest cylinder in which Roll 100 fits. As used herein, "substantially vertical" indicates vertical, or any departure from vertical less than 40°. Further, as described herein, Roll 100 would be in a substantially vertical orientation if the central axis of Roll 100 were substantially vertical. Roll 100 may, for example, have a substantially vertical orientation as it is positioned on a substantially vertical piling. Rolls may be positioned on pilings or other substantially vertical members such as posts or rods. Rolls may be stacked with two, three, four or more rolls on top of each other. In such stacked configurations, the top roll may be fully submerged underwater or most of the top roll may be submerged.

Indications of roll height are measured along the roll central axis and indications of roll width are based on the outside diameter of the roll. The roll height may, for example, be 5.0 feet with certain examples falling between 0.7 and 16.0 feet and a significant number of those examples falling between 2.8 and 10.5 feet. The roll width may, for example, be 4.5 feet with certain examples falling between 1.5 and 9.0 feet and a significant number of those examples falling between 3.0 and 6.8 feet. The web pad thickness may, for example, be 2.0 inches with certain examples falling between 0.2 and 6.5 inches and a significant number of those examples falling between 1.1 and 4.3 inches. The number of spokes in a roll may be three or more. The number of spokes may, for example, be about 0.30 spokes per square foot of roll external surface area with certain examples falling between 0.50 and 3.00 spokes per square foot of roll external surface area and a significant number of those examples falling between 0.40 and 1.65 spokes per square foot of roll external surface area. The inner tube inner diameter may, for example, be 12.0 inches with certain examples falling between 1.0 and 24.0 inches and a significant number of those examples falling between 6.5 and 18.0 inches.

In many examples the type of web pad used in the construction of the rolls is overwhelmingly void space. The percentage of void space in the web pad may, for example, be 96.0 percent with certain examples falling between 70.0 and 99.0 percent and a significant number of those examples falling between 83.0 and 97.5 percent.

Rolls may be constructed in various heights including 7.5 feet 5.0 feet, 3.75 feet and 2.5 feet. The various individual rolls or roll stacks may be combined in a stacking fashion on a piling or other vertical member, to achieve a desirable height. The roll stack height may differ from the height of the water column at the point of installation by less than 3 feet and in many circumstances that variation may be less than 2 feet with certain examples being less than 1 foot. The top of the roll stack may be fixed by nailing one or more boards at the desired top height for the top roll. Many other methods of mechanically limiting the movement of the roll on the piling or other vertical member may be used.

The rolls are designed to be relatively buoyancy neutral when filled with water. The density of the roll when completely water filled may, for example, be 62 pounds per cubic foot with certain examples falling between 55 and 70 pounds per cubic foot and a significant number of those examples falling between 59 and 66 pounds per cubic foot.

The rolls or roll stacks may be configured horizontally adjacent to one another in a line or in multiple lines. The between roll spacing may, for example, be 1.0 feet with certain examples falling between 0.3 and 4.0 feet and a significant number of those examples falling between 0.7 and 2.5 feet.

Installed rolls may fill or partially fill with sediment, limit the movement of sediment and may absorb wave energy.

In an alternate embodiment, the piling may be replaced with a series of substantially vertical rods rising above an auger blade that is embedded in the soil or sediment below.

The materials used in the construction of the rolls may be from food safe materials, particularly food safe plastics and coatings. Such construction may add to the environmentally friendly nature of the rolls.

Rolls may also be coated with granular materials to enhance the growth of oysters. Further, the rolls may be positioned for the growth of plants on the top of the roll and may even be planted for such.

As that term is used herein, the term "anchor" indicates a device that contacts the bottom of a body of water and restricts the motion of an object such as a bale or roll. Examples of anchors may include pilings, augers and boat anchors.

Aquatic structures described herein may, for example, comprise, a first nonwoven fiber mat; a first connecting material; an anchor and a protective coating; such that the first nonwoven fiber mat may be configured as a first roll; the first roll may have a first layer, a second layer and a third layer; the first connecting material may connect the first layer to the second layer and may connect the second layer to the third layer; a majority of the first roll is submerged in a body of water and the anchor may be connected to a floor of the body of water. In a related example, the first nonwoven fiber mat may be a first plastic nonwoven fiber mat. In a related example, the first nonwoven fiber mat may have a mat thickness between 0.2 and 6.5 inches. In a related example, the protective coating may enclose the first roll. In a related example, a roll top of the first roll may be located within 2 feet of a surface of the body of water. In a related example, the first roll may have a roll height between 0.7 and 16 feet. In a related example, the first connecting material may be configured as at least two spokes. In a related example, the first roll may have a central axis; the first connecting material may be configured as at least two spokes and the at least two spokes may be in radial alignment with the central axis. In a related example, the aquatic structure may also have a cylindrical opening within the first roll having an internal diameter between 1 and 24 inches. In a related example, the aquatic structure may also have a cylindrical opening within the first roll such that the first roll has a central axis and the cylindrical opening is coaxial with the central axis. In a related example, the first nonwoven fiber mat has a collective void space making up between 70.0 and 99.0% of a space occupied by the first nonwoven fiber mat. In a related example, the aquatic structure may also have a second roll comprising a second nonwoven fiber mat and a second connecting material such that the second roll is situated below the first roll. In a related example, the first roll may have a water inundated density between 55 and 70 pounds per cubic foot. In a related example, the first roll may have a first roll height between 2.8 and 10.5 feet. In a related example, the first connecting material may be a plastic foam. In a related example, the aquatic structure may also have a second roll such that the second roll rests on the floor of the body of water. In a related example, the anchor may comprise a piling and the first roll may be positioned on the piling. In a related example, the anchor comprises an auger blade.

In a further related example, the aquatic structure may also have a second roll comprising a second nonwoven fiber mat that is a second plastic nonwoven fiber mat and a second connecting material and a cylindrical opening within the first roll having an internal diameter between 1 and 24 inches such that the first nonwoven fiber mat is a first plastic nonwoven fiber mat; such that the second roll is situated below the first roll; the second roll rests on the floor of the body of water; the first roll has a central axis; the central axis has a substantially vertical orientation; the cylindrical opening within the first roll is coaxial with the central axis; the first nonwoven fiber mat has a collective void space making up between 70.0 and 99.0% of a space occupied by the first nonwoven fiber mat; the first nonwoven fiber mat has a mat thickness between 0.2 and 6.5 inches; the protective coating encloses the first roll; the first roll has a first roll height between 2.8 and 10.5 feet; a roll top of the first roll is located within 2 feet of a surface of the body of water; the first connecting material is configured as at least two spokes and the at least two spokes are in radial alignment with the central axis; the first roll has a water inundated density between 55 and 70 pounds per cubic foot and the anchor comprises a piling and the first roll is positioned on the piling.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:
1. An aquatic structure comprising:
 a. a first nonwoven fiber mat;
 b. a first connecting material;
 c. an anchor and
 d. a protective coating;
 e. wherein the first nonwoven fiber mat is configured as a first roll;
 f. wherein the first roll has a first layer, a second layer and a third layer;
 g. wherein the first connecting material connects the first layer to the second layer and connects the second layer to the third layer;
 h. wherein a majority of the first roll is submerged in a body of water;
 i. wherein the anchor is connected to a floor of the body of water;
 j. wherein the first roll has a central axis;
 k. wherein the first connecting material is configured as at least two spokes and
 l. wherein the at least two spokes are in radial alignment with the central axis.

2. The aquatic structure of claim 1 wherein the first nonwoven fiber mat is a first plastic nonwoven fiber mat.

3. The aquatic structure of claim 1 wherein the first nonwoven fiber mat has a mat thickness between 0.2 and 6.5 inches.

4. The aquatic structure of claim 1 wherein the protective coating encloses the first roll.

5. The aquatic structure of claim 1 wherein a roll top of the first roll is located within 2 feet of a surface of the body of water.

6. The aquatic structure of claim 1 wherein the first roll has a roll height between 0.7 and 16 feet.

7. The aquatic structure of claim 1 further comprising a cylindrical opening within the first roll having an internal diameter between 1 and 24 inches.

8. The aquatic structure of claim 1 further comprising a cylindrical opening within the first roll wherein the first roll has a central axis and the cylindrical opening is coaxial with the central axis.

9. The aquatic structure of claim 1 wherein the first nonwoven fiber mat has a collective void space making up between 70.0 and 99.0% of a space occupied by the first nonwoven fiber mat.

10. The aquatic structure of claim 1 further comprising a second roll comprising a second nonwoven fiber mat and a second connecting material wherein the second roll is situated below the first roll.

11. The aquatic structure of claim 1 wherein the first roll has a water inundated density between 55 and 70 pounds per cubic foot.

12. The aquatic structure of claim 1 wherein the first roll has a first roll height between 2.8 and 10.5 feet.

13. The aquatic structure of claim 1 wherein the first connecting material is a plastic foam.

14. The aquatic structure of claim 1 further comprising a second roll wherein the second roll rests on the floor of the body of water.

15. The aquatic structure of claim 1 wherein the anchor comprises a piling and the first roll is positioned on the piling.

16. The aquatic structure of claim 1 wherein the anchor comprises an auger blade.

17. The aquatic structure of claim 1 further comprising:
a. a second roll comprising a second connecting material and a second nonwoven fiber mat that is a second plastic nonwoven fiber mat and
b. a cylindrical opening within the first roll having an internal diameter between 1 and 24 inches;
c. wherein the first nonwoven fiber mat is a first plastic nonwoven fiber mat;
d. wherein the second roll is situated below the first roll;
e. wherein the second roll rests on the floor of the body of water;
f. wherein the central axis has a substantially vertical orientation;
g. wherein the cylindrical opening within the first roll is coaxial with the central axis;
h. wherein the first nonwoven fiber mat has a collective void space making up between 70.0 and 99.0% of a space occupied by the first nonwoven fiber mat;
i. wherein the first nonwoven fiber mat has a mat thickness between 0.2 and 6.5 inches;
j. wherein the protective coating encloses the first roll;
k. wherein the first roll has a first roll height between 2.8 and 10.5 feet;
l. wherein a roll top of the first roll is located within 2 feet of a surface of the body of water;
m. wherein the first roll has a water inundated density between 55 and 70 pounds per cubic foot;
n. wherein the first connecting material is a plastic foam;
o. wherein the anchor comprises a piling and
p. wherein the first roll is positioned on the piling.

* * * * *